United States Patent
Schneider et al.

(10) Patent No.: US 9,806,763 B2
(45) Date of Patent: Oct. 31, 2017

(54) DEVICE FOR POWER LINE COMMUNICATION, POWER LINE COMMUNICATIONS SYSTEM, METHOD FOR OPERATING A DEVICE FOR POWER LINE COMMUNICATION AND FOR ADAPTING PLC TRANSMISSIONS TO NOISE

(71) Applicant: Sony Corporation, Tokyo (JP)

(72) Inventors: Daniel Schneider, Stuttgart (DE); Andreas Schwager, Waiblingen (DE)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 14/424,199

(22) PCT Filed: Jul. 10, 2013

(86) PCT No.: PCT/EP2013/002037
§ 371 (c)(1),
(2) Date: Feb. 26, 2015

(87) PCT Pub. No.: WO2014/037066
PCT Pub. Date: Mar. 13, 2014

(65) Prior Publication Data
US 2015/0326279 A1    Nov. 12, 2015

(30) Foreign Application Priority Data
Sep. 10, 2012  (EP) ..................... 12006346

(51) Int. Cl.
*H04B 3/54* (2006.01)
*H04L 1/00* (2006.01)
*H04L 27/26* (2006.01)

(52) U.S. Cl.
CPC ............... *H04B 3/54* (2013.01); *H04B 3/542* (2013.01); *H04B 3/544* (2013.01); *H04L 1/0033* (2013.01);
(Continued)

(58) Field of Classification Search
CPC .......... H04B 3/54; H04B 3/542; H04B 15/00; H04B 3/544; H04L 1/0006; H04L 1/0033;
(Continued)

(56) References Cited

U.S. PATENT DOCUMENTS 4,845,466 A * 7/1989 Hariton ................. H04B 3/542
                                                    340/12.34
7,978,756 B2 * 7/2011 Samdani ............... H04B 3/487
                                                    375/227
(Continued)

OTHER PUBLICATIONS

International Search Report and Written Opinion of the International Searching Authority Issued Aug. 29, 2013 in PCT/EP13/002037 Filed Jul. 10, 2013.

*Primary Examiner* — Betsy Deppe
(74) *Attorney, Agent, or Firm* — Oblon, McClelland, Maier & Neustadt, L.L.P.

(57) ABSTRACT

A method for operating a device for power line communication includes measuring noise on the power line and detecting noise timing properties. Further, a method for adapting power line communication to detected noise timing properties, which may be asynchronous to the AC mains signal, includes adapting parameters for encoding a data stream and/or transmission parameters according to the detected noise timing properties and/or transmission timing information derived from the detected noise timing properties, encoding a data stream according to the adapted parameters for encoding, and transmitting the encoded data stream to the power line on at least one power line communications channel according to the adapted transmission parameters.

23 Claims, 10 Drawing Sheets

(52) U.S. Cl.
CPC ............ *H04L 1/0036* (2013.01); *H04L 27/26* (2013.01); *H04L 27/2626* (2013.01); *H04L 27/2647* (2013.01); *H04B 2203/5495* (2013.01)

(58) Field of Classification Search
CPC ............... H04L 1/0036; H04L 25/0202; H04L 27/2601; H04L 27/2626; H04L 27/2647
USPC .................... 375/222, 257, 260, 285, 354
See application file for complete search history.

(56) References Cited

U.S. PATENT DOCUMENTS

| | | | |
|---|---|---|---|
| 2007/0124624 A1* | 5/2007 | Starr | G11B 20/24 714/700 |
| 2008/0304577 A1 | 12/2008 | Koga et al. | |
| 2010/0220771 A1* | 9/2010 | Tzannes | H04L 1/0009 375/219 |
| 2011/0002400 A1 | 1/2011 | Guerrieri et al. | |
| 2011/0249780 A1* | 10/2011 | Mollfulleda San Julian | H04L 27/2656 375/354 |
| 2012/0033722 A1 | 2/2012 | Varadarajan et al. | |
| 2012/0093240 A1 | 4/2012 | McFarland et al. | |

\* cited by examiner

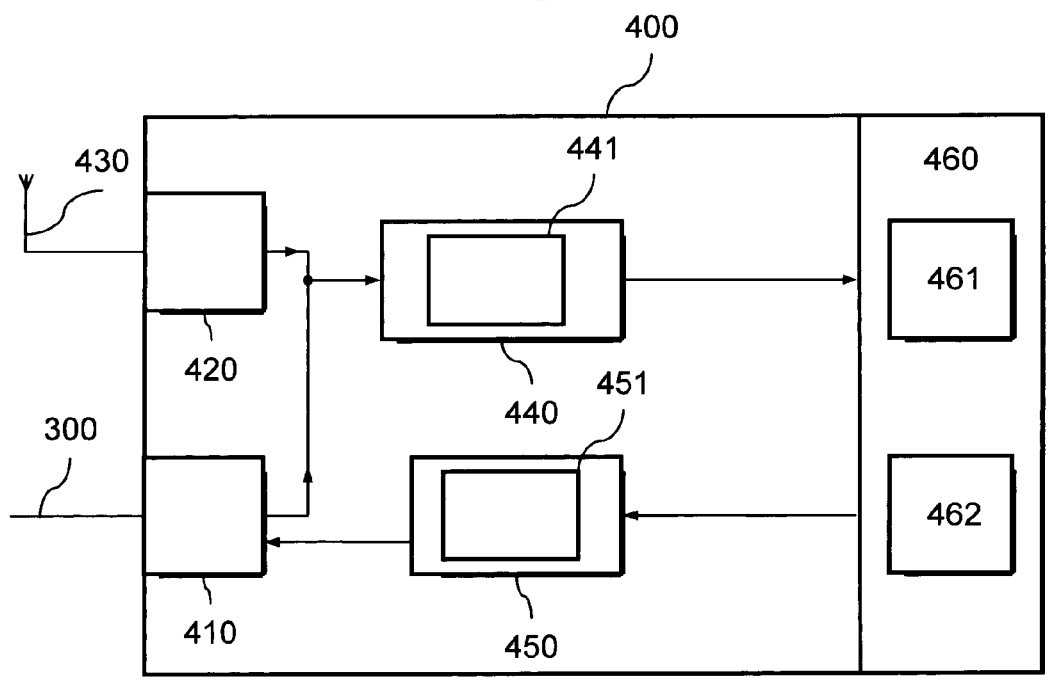
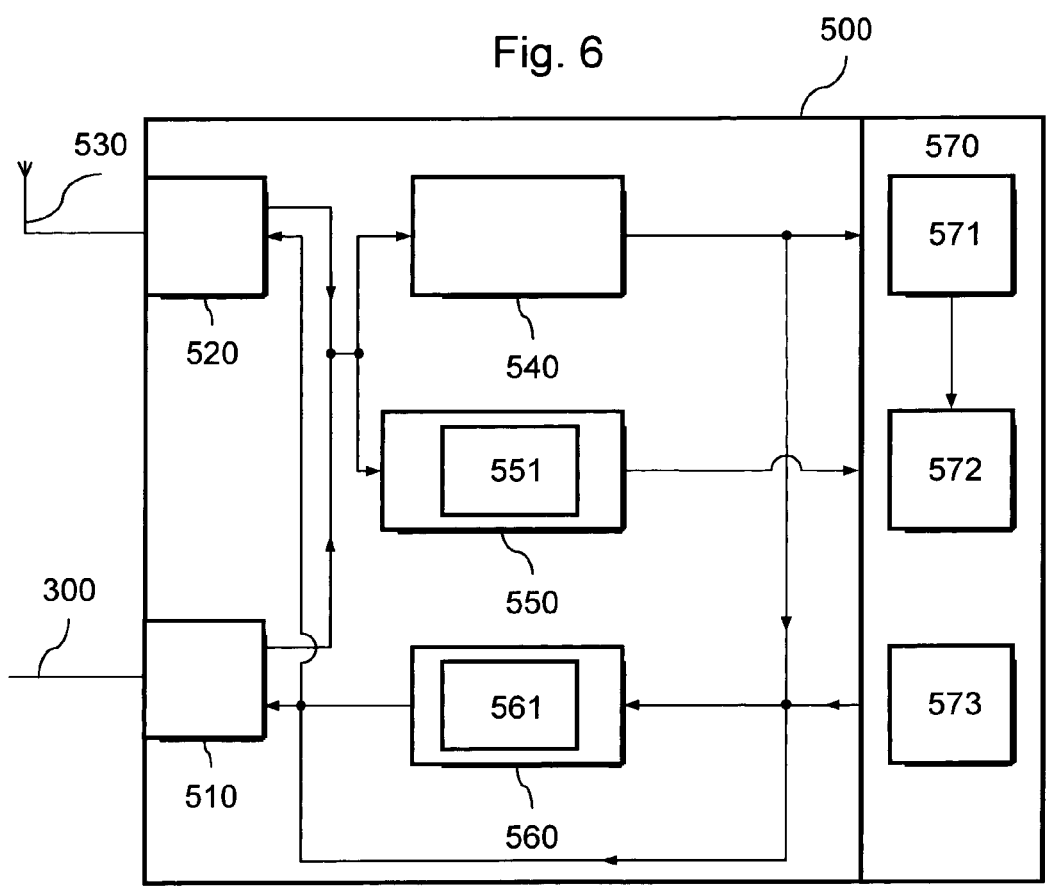

DEVICE FOR POWER LINE COMMUNICATION, POWER LINE COMMUNICATIONS SYSTEM, METHOD FOR OPERATING A DEVICE FOR POWER LINE COMMUNICATION AND FOR ADAPTING PLC TRANSMISSIONS TO NOISE

CROSS-REFERENCE TO RELATED APPLICATIONS

The present application is based on PCT/EP2013/02037 filed Jul. 10, 20123 and claims priority to European Patent Application 12 006, 346.6, filed in the European Patent Office on Sep. 10, 2012, the entire contents of each of which being incorporated herein by reference.

BACKGROUND

Field of the Disclosure

The present disclosure relates to a device for power line communication, a power line communications system, a method for operating a device for power line communication and for adapting PLC transmissions to noise as well as a computer program product for performing such a method.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Power line communication (PLC) using a power line for transmitting data between at least one transmitting device or transmitting modem (PLC transmitter) and at least one receiving device or receiving modem (PLC receiver) may be interfered by noise which may be periodic impulsive noise caused, for instance, by switching devices connected to the power line. However, the occurrence of the noise may not be synchronous with the AC mains signal, i.e. with the AC mains cycle. Furthermore, the noise may be louder at the receiver side than at the transmitter side, and sometimes the PLC transmitter does even not notice the noise which occurs at the PLC receiver. In the result, the throughput of PLC modems may go down to 0 bit/s.

SUMMARY

Therefore, it is an object of the present disclosure to provide a device for power line communication and a power line communications system, which are configured to detect noise and to adapt the transmission of data to it, as well as a method for operating a device for power line communication and for adapting PLC transmissions to the noise.

This object is solved by the claimed subject-matter according to the independent claims.

A device for power line communication according to a first embodiment comprises an input to receive signals from a power line, a noise detector to detect timing properties of noise, and an output to transmit the detected noise timing properties and/or transmission timing information derived from the detected noise timing properties to at least one other device for power line communication connected to the power line.

According to a second embodiment, a device for power line communication to be connected to a power line comprises an input to receive signals from another device for power line communication connected to the power line, a data detector to detect data within the received signals, the data describing timing properties of noise at the other device for power line communication and/or transmission timing information derived from the detected noise timing properties, an encoder, an output to transmit an encoded data stream to the power line on at least one power line communications channel, and a processor to adapt the parameters of the encoder and/or the transmission parameters of the output according to the detected data.

A power line communication system may comprise a first device for power line communication according to the first embodiment, a second device for power line communication according to the second embodiment, and a power line connecting the first device and the second device via at least one power line communications channel.

A method for operating a device for power line communication connected to a power line according to a first embodiment comprises measuring noise on the power line, detecting timing properties of the noise, and transmitting the detected noise timing properties and/or transmission timing information derived from the detected noise timing properties to at least one other device for power line communication connected to the power line.

According to a second embodiment, a method for operating a device for power line communication connected to a power line comprises receiving signals from another device for power line communication connected to the power line, detecting data within the received signals, the data describing detected noise timing properties and/or transmission timing information derived from said detected noise timing properties at the other device for power line communication, adapting parameters for encoding a data stream and/or transmission parameters for transmitting an encoded data stream according to the detected data, encoding a data stream according to the adapted parameters, and transmitting the encoded data stream to the power line on at least one power line communications channel according to the adapted transmission parameters.

A method for operating a power line communication system including a power line, a first device for power line communication and a second device for power line communication, the first and the second device being connected to the power line, may comprise performing a method for operating a device for power line communication according to the first embodiment at the first device for power line communication and performing a method for operating a device for power line communication according to the second embodiment at the second device for power line communication.

A computer program product includes computer-program instructions, which, when executed by a computer, may cause a device for power line communication to perform a method for operating a device for power line communication according to the first embodiment or to perform a method for operating a device for power line communication according to the second embodiment.

The foregoing paragraphs have been provided by way of general introduction, and are not intended to limit the scope of the following claims. The described embodiments, together with further advantages, will be best understood by reference to the following detailed description taken in conjunction with the accompanying drawings. The elements of the drawings are not necessarily to scale relative to each other.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 5 illustrates a second embodiment of a device for power line communication, wherein the device is used as a PLC transmitter.

FIG. 6 illustrates a third embodiment of a device for power line communication, wherein the device is a combined PLC receiver and transmitter.

DESCRIPTION OF THE EMBODIMENTS

Figure 1:
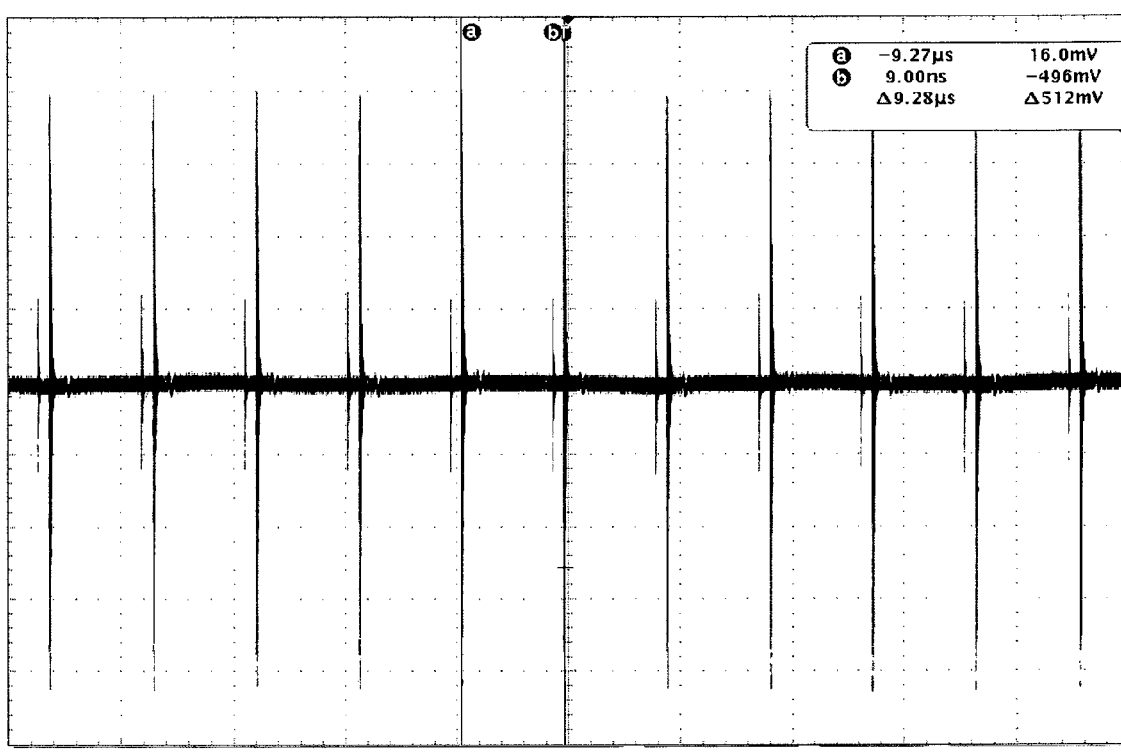
FIG. 1 illustrates an example of a noise signal of a periodic noise.

Referring now to the drawings, wherein like reference numerals designate identical or corresponding parts throughout the several views, embodiments of the disclosure are explained.

FIG. 1 illustrates an example of a noise signal of a periodic noise as measured on a power line during a quiet state of communication, e.g. at a time when no communication signals are transmitted. FIG. 1 shows a plurality of similar noise bursts, e.g. impulsive noise bursts, having specific properties like a constant time interval between individual noise bursts. In the shown example, the noise bursts are repeated every 9.28 µs, wherein the larger ones of the noise bursts have a maximum amplitude of 512 mV. In a gap time between two individual noise bursts, noise has a relatively small amplitude of around 56 mV.

Figure 2:
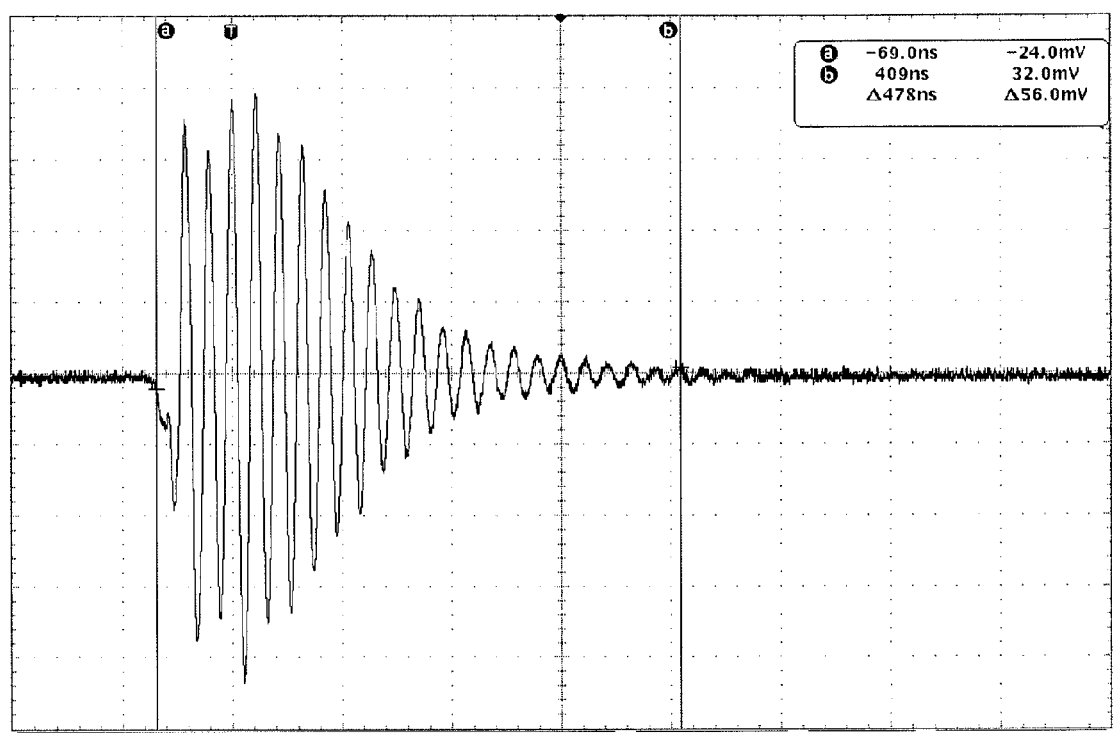
FIG. 2 illustrates an example of a single noise burst of a periodic noise.

FIG. 2 illustrates an example of a single noise burst of a periodic noise, wherein the noise burst has a length or duration of 478 ns.

Figure 3:
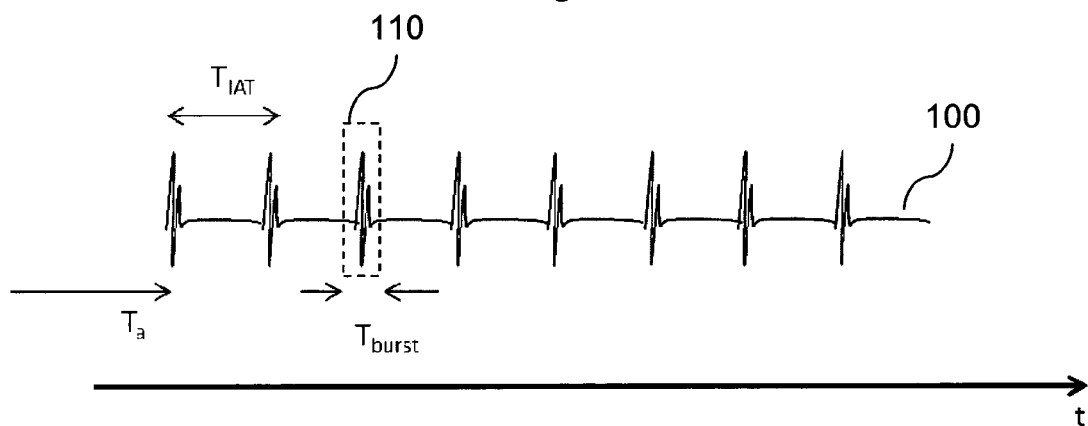
FIG. 3 illustrates properties describing a periodic noise signal.

FIG. 3 visualizes noise timing properties of a periodic noise signal. Noise timing properties describe characteristics of the noise signal with relation to time. They allow to distinguish between noise and PLC transmission and to identify the presence of noise. A periodic noise signal 100 having a plurality of individual noise bursts 110 is shown over a time axis t. In this embodiment, the noise signal is described by the periodic impulse arrival time $T_{IAT}$, which is the period or periodic time of the signal, and which is 9.28 µs in the example of FIG. 1, the duration $T_{burst}$ of a noise burst, which is 478 ns in the example of FIG. 2, and the arrival time $T_a$ of a noise burst. The arrival time $T_a$ may be defined relative to a reference time, for instance to an internal clock of a device measuring the noise signal.

From the periodic impulse arrival time $T_{IAT}$, the impulse arrival frequency IAF may be calculated according to formula (1):

$$IAF = \frac{1}{T_{IAT}}. \tag{1}$$

For the example shown in FIG. 1, IAF is therefore 107.8 kHz. This is an average noise frequency of all switching power supplies connected to the power line. The periodic noise signal may be asynchronous to the AC mains signal.

Periodic noise might have the characteristic of white noise, which is present over frequency bands used for power line communication such that a simple notching of frequency bands showing such a periodic noise is not applicable.

Furthermore, the noise signals might be louder at a receiver in a power line communications system than the communication signals sent by a transmitter in the power line communications system. Therefore, a reception and decoding of the transmitted signals may not be possible anymore at the receiver.

Figure 4:
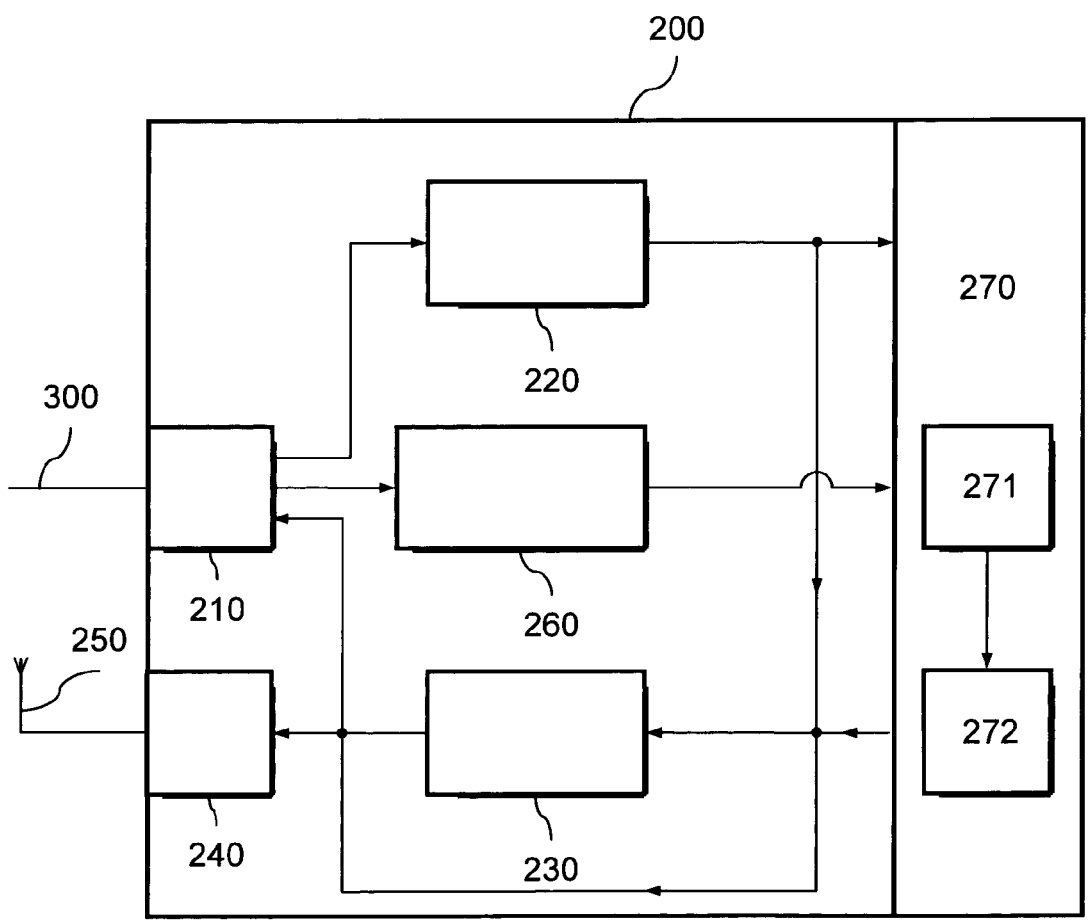
FIG. 4 illustrates a first embodiment of a device for power line communication, wherein the device is used as a PLC receiver.

FIG. 4 illustrates a first embodiment of a device for power line communication, wherein the device is used as a PLC receiver. The device 200 (also referred to as receiver) comprises an input/output 210 which is configured to be connected to a power line 300 and which is configured to receive and transmit signals from or to the power line 300 on at least one power line communications channel. Such a communications channel may include a transmission channel and a transmission path. A transmission channel may be defined, for instance, by a triple of frequency, time and power used for power line communication or by one or two of these parameters. Power line communication signals may be transmitted via one or more transmission paths, wherein the transmission paths are defined by two or more of the wires of the power line 300. For example, power line communication signals may be transmitted as differential mode signals using a specific pair of wires for transmitting signals, e. g. Phase and Protective Earth, Protective Earth and Neutral or Phase and Neutral.

The receiver 200 further comprises a noise detector 220 configured to measure a noise signal within the received signals and to detect properties like an amplitude of the noise bursts and timing properties of the noise, e. g. the impulse arrival frequency IAF of the noise signal, the duration $T_{burst}$ of a noise burst, the arrival time $T_a$ of the noise burst and/or the gap time between noise bursts. The term "detect" may include directly measuring respective properties or determining respective properties from measured values. The noise timing properties IAF, $T_{burst}$ and $T_a$ may in one exemplary case be detected only in the case that the amplitude of the noise bursts exceeds a predetermined threshold value which would cause interferences to a power line communication using the power line 300. In the following, it is presumed that this case applies. The noise detector 220 may be further adapted to detect whether the noise is a periodic noise signal.

The receiver 200 may further comprise a transmitting control unit 230 which is configured to encode the detected noise timing properties, e.g. IAF, $T_{burst}$ and $T_a$, such that they can be transmitted to at least one other device for power line communication connected to the power line 300. Alternatively or additionally, transmission timing information may be derived from the detected noise timing properties and sent to the transmitting control unit 230. Transmission timing information includes information which a transmitter (e. g. transmitter 400 shown in FIG. 5) may use to control or influence the timing of the transmission of PLC signals to the receiver 200. For example, in OFDM-based power line communication, transmission timing information may indicate an OFDM symbol duration, a duration of an OFDM guard interval, a start time for sending an OFDM symbol, and/or a number of repetitions of a specific OFDM symbol. If other PLC systems using, for instance, wavelet or Watt Pulse Communication, are used, the transmission timing information include timing information arising from corresponding parameters of the used communication system. Preferably, the transmission timing information is chosen based on the noise timing properties such that interference of PLC signals with the noise signal detected at receiver 200 will be minimized or at least reduced. The transmitting control unit 230 may comprise one or more of an error correction unit, a modulator, a transformer performing, for instance, an Inverse Fast Fourier Transformation or an inverse wavelet transformation, a notch filter, a digital/analog converter and an amplifier.

However, the transmitting control unit 230 may be omitted if the detected noise timing properties and/or the transmission timing information can be transmitted as they are provided from the noise detector 220, or the noise detector 220 may itself encode the detected noise timing properties and/or the transmission timing information for transmission to the at least one other device for power line communication. The detected noise timing properties and/or the transmission timing information may be transmitted via the input/output 210 to the power line 300 or may be transmitted via another suitable output of the receiver 200. For example, FIG. 4 shows an output 240 connected to an antenna 250 for transmitting the determined values wirelessly. Furthermore, the detected noise timing properties and/or the transmission timing information may be transmitted either directly to the at least one other device for power line communication connected to the power line, or they may be transmitted first to a control device, for instance a computer, which subsequently provides the detected noise timing properties and/or the transmission timing information to the at least one other device for power line communication or which controls the operation of the at least one other device for power line communication according to the determined values.

The transmission of the noise timing properties and/or the transmission timing information may be made dependent on whether or not periodic noise is detected. For example transmission of these timing properties and/or the transmission timing information may be made only if periodic noise is detected. Furthermore, the transmission of the noise timing parameters and/or of the transmission timing information may be made dependent on whether or not the periodicity of the noise is different from the periodicity of the AC mains cycle on the power line. For example, transmission of the noise timing parameters and/or of the transmission timing information may be made only if the periodicity of the noise is different from the periodicity of the AC mains cycle on the power line.

The noise detector 220 may be adapted to detect and/or determine the timing properties of the noise periodically. Alternatively or additionally, the transmission of the noise timing properties and/or of the transmission timing information may be performed periodically. This may be especially advantageous if the receiver 200 does not detect PLC signals, because there is no other device transmitting PLC signals or because the PLC signals can not be detected caused be severe noise on the power line communication channel.

The receiver 200 may further comprise a decoding unit 260 for decoding data transmitted via the power line 300 from a transmitter for power line communication via the at least one power line communications channel. These data may comprise a local time of the transmitter indicating the sending time of the transmitted data or a Frame Start preamble. The decoding unit 260 may comprise one or more of an amplifier, an analog/digital converter, a transformer performing, for instance, a Fast Fourier Transformation (FFT) or a wavelet transformation, a demodulator and an error correction unit.

The receiver 200 may further comprise a processing unit 270 for processing decoded data provided from the decoding unit 260 and for providing data which should be encoded by the transmitting control unit 230. Furthermore, also data from the noise detector 220, for instance the determined values of IAF, $T_{burst}$ and $T_a$, may be provided to the processing unit 270. It is also possible that the processing unit 270 is configured to perform some of the functions described with respect to the noise detector 220. For instance, the processing unit may be configured to determine one or more of IAF, $T_{burst}$ and $T_a$.

The processing unit 270 may comprise a processor 271 and a clock 272. The processor 271 may be configured to detect a local time of a transmitter for power line communication from the decoded data provided from the decoding unit 260 and an arrival time of the data at the receiver 200 and to calculate a mean arrival time of a plurality of transmitted data and a constant propagation delay of the at least one power line communication channel. Using the calculated mean arrival time and the constant propagation delay, the processor 271 may synchronize the clock 272 to the local time of the transmitter, i.e. to a clock of the transmitter. Alternatively, it is possible that the receiver 200 instructs the transmitter to synchronize to the local time of the receiver.

According to another embodiment, the processor 271 is configured to detect an arrival time of a Frame Start preamble within data transmitted via the at least one power line communications channel. Since every transmission from a transmitter connected to the power line 300 has to be done in a precise time raster, i.e. the signal bursts are always transmitted within a very small and precise time window, the processor 271 is able to synchronize the clock 272 to the time window of the Frame start preamble. According to Homeplug AV2 standard, this time window for starting a transmission is ±0.5 µs, wherein a more precise synchronization can be achieved by minimizing the tolerance window. The processor 271 may be configured to calculate a mean arrival time of a plurality of Frame Start preambles and a constant propagation delay of the at least one power line communication channel. Considering the mean and variance of the Frame Start preamble arrival times and the frequency raster for transmission, which is predetermined for a given standard, the processor 271 may achieve synchronization.

For both examples for synchronization, the clock 272 of the receiver 200 as well as a clock of a transmitter connected to the power line 300 should be very precise. In order to detect noise bursts with a duration $T_{burst}$ of approximately 500 ns, an accuracy of the clocks of around 50 ns is appropriate, and the tolerance window for transmission of signals will be ±25 ns.

Both ways of synchronization described above may be combined, wherein the first way of using the transmitted local time of the transmitter might provide a rough synchronization and the second way of using the Frame Start preamble might provide a fine synchronization.

A precise synchronization of the clock 272 of the receiver 200 to a clock of a transmitter is advantageous for adapting PLC transmissions to periodic noise as will be described later.

FIG. 5 illustrates a second embodiment of a device for power line communication, wherein the device is used as a PLC transmitter. The device 400 (also referred to as transmitter or transmitting device) comprises an input/output 410 which is configured to be connected to a power line 300 and which is configured to receive and transmit signals from or to the power line 300 on at least one power line communications channel.

The transmitter 400 may further comprise another suitable input which is able to receive signals from at least one other device for power line communication connected to the power line 300. For example, FIG. 5 shows an input 420 connected to an antenna 430 for receiving signals wirelessly. Furthermore, the received signals may be transmitted not directly from the at least one other device for power line communication connected to the power line, but may be received from a control device, for instance a computer, which previously received data or signals from the at least one other device for power line communication. Such another device for power line communication may be, for instance, a receiver 200 as described with respect to FIG. 4.

The transmitter 400 further comprises a data detector 441 configured to detect data within the received signals, the data describing noise timing properties like an impulse arrival frequency IAF of a noise signal, a duration $T_{burst}$ of a noise burst, an arrival time $T_a$ of the noise burst and/or a gap time between noise bursts at the at least one other device for power line communication. Alternatively or additionally, the data may be transmission timing information derived from noise timing properties, as e.g. an OFDM symbol duration, a duration of an OFDM guard interval, a start time for sending an OFDM symbol, and/or a number of repetitions of a specific OFDM symbol, which can be derived in the receiver and transmitted to the transmitter. If the data describing the noise timing properties and/or the transmission timing information are received in an encoded way, the transmitter 400 may comprise a decoding unit 440 configured to decode the received signals. The decoding unit 440 may comprise one or more of an amplifier, an analog/digital converter, a transformer performing, for instance, a Fast Fourier Transformation or a wavelet transformation, a demodulator and an error correction unit. Furthermore, the data detector 441 may be a part of the decoding unit 440, as shown in FIG. 5.

The transmitter 400 further comprises an encoder 451 which may be a part of a transmitting control unit 450 which processes data such that they can be transmitted to at least one other device for power line communication connected to the power line 300. The transmitting control unit 450 may comprise one or more of an error correction unit, a modulator, a transformer performing, for instance, an Inverse Fast Fourier Transformation (iFFT) or an inverse wavelet transformation, a notch filter, a digital/analog converter and an amplifier, wherein the encoder 451 may include one or more of these components. The encoder 451 is configured to encode a data stream for transmission according to a modulation scheme.

A data stream encoded by the encoder 451 or provided from the transmitting control unit 450 is then provided to the input/output 410 for transmitting it to the power line 300 on the at least one power line communications channel. The data stream is transmitted using specific transmission parameters, like symbol duration, carrier spacing, timing of transmission, repetition of OFDM symbols or length of the Guard symbol. The transmission parameters may be controlled, for instance, by the transmitting control unit 450.

The transmitter 400 may further comprise a processing unit 460 for processing decoded data provided from the decoding unit 440 and for providing data which should be encoded by the transmitting control unit 450. It is also possible that the processing unit 460 is configured to perform the function described with respect to the data detector 441. In other words, the data detector 441 may be a part of the processing unit 460 instead of being a part of the decoding unit 440.

The transmitter 400 further comprises a processor 461 which is configured to adapt the parameters of the encoder 451 and/or the transmission parameters of the input/output 410 according to the data detected by the data detector 441. For example if data describing noise timing properties is received at the receiver, the parameters used by the encoder 451 may be adapted based on the noise timing properties. Furthermore, the processor 461 may derive transmission timing information from the detected noise timing properties and may adapt the transmission parameters according to the derived transmission timing information. If data describing transmission timing information is received, the transmission timing information may be directly used as one or more of the parameters used by encoder 451 and/or as transmission parameters. Thus, the transmission of a data stream may be adapted to a noise signal, e.g. a periodic impulsive noise signal, received at the at least one other device for power line communication in a way that interference etc. is reduced. Examples for how the parameters of the encoder 451 are adapted are explained later with respect to FIGS. 13 to 15.

In particular, the parameters of the encoder 451 and/or the transmission parameters of the input/output 410 are adapted according to the detected data when transmitting data to that device from which the data were received in the data detector 441. That is, the adaption of parameters of the encoder 451 and/or of the transmission parameters may be done only for transmissions to a single, specific receiver or receiving device in a power line communication system. However, the adaption of parameters may be done also for transmission to all receivers in the power line communication system, provided that none of the other receivers in the power line communication system provides data indicating other adaptions of the encoding parameters and/or transmission parameters.

The processor 461 may be a part of the processing unit 460 or may be a part of the transmitting unit 450 or may be provided on its own.

The processing unit 460 may further comprise a clock 462. The clock 462 is used to provide a local time of the transmitter 400 to the transmitted data stream and to appoint a start time for transmission of data. In an embodiment, the clock 462 is synchronized to a clock of the at least one other device for power line communication from which the signals comprising the data describing timing properties of noise and/or transmission timing information were received.

FIG. 6 illustrates a third embodiment of a device for power line communication, wherein the device is a combined PLC receiver and transmitter. The device 500 (also called PLC modem) comprises at least components for receiving signals from a power line 300 and for decoding data included in the received signals as well as components for encoding data and transmitting respective signals onto the power line 300. That is, the PLC modem 500 comprises a first input/output 510 configured to be connected to the power line 300 and may further comprise a second input/output 520 connected, for instance, to an antenna 530, as well as respective components for receiving data from and transmitting data to the second input/output 520. The PLC modem 500 comprises a noise detector 540 corresponding to the noise detector 220 as described above and a decoding unit 550 as well as a data detector 551 corresponding to the decoding unit 440 and the data detector 441, respectively, as described above. The PLC modem 500 further comprises a transmitting control unit 560 and an encoder 561 corresponding to the transmitting control unit 450 and the encoder 451, respectively, as described above. The transmitting control unit 560 may also provide the functionalities of the transmitting control unit 230 as described above. The PLC modem 500 further comprises a first processor 571 corresponding to the processor 271 and a second processor 573 corresponding to the processor 462, respectively, as described above. However, the PLC modem 500 may comprise only one processor including the functionalities of both the first processor 571 and the second processor 573. The PLC modem 500 further comprises a clock 572 corresponding to the clocks 272 and 462 as described above.

The first processor 571, the second processor 573 and the clock 572 may be part of a processing unit 570 corresponding to the processing units 270 and 460 as described above and combining the functionality of both processing units 270 and 460. That is, the PLC modem 500 may be operated as the receiver 200 as described above or may be operated as the transmitter 400 as described above or it may be operated such that it combines the functions of detecting noise timing properties of a noise signal with the functions of adapting the parameters of an encoder and/or the transmission parameters according to the detected noise timing properties and encoding and transmitting a data stream in this way.

Figure 7:
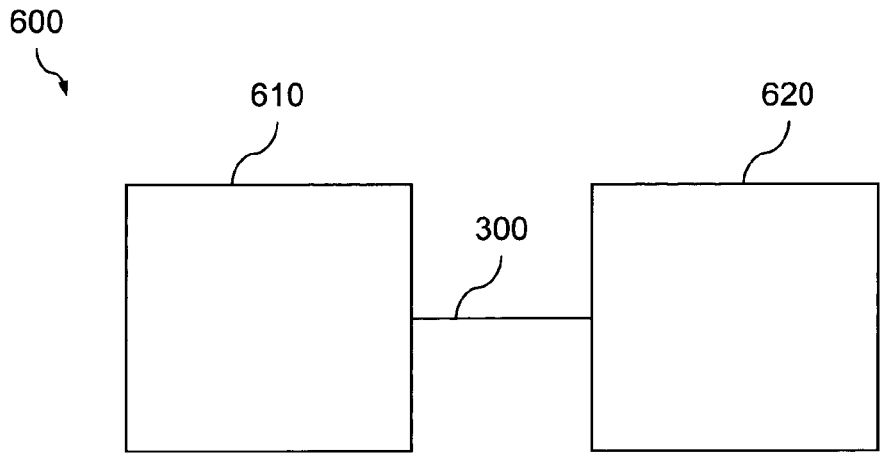
FIG. 7 illustrates an embodiment of a power line communications system.

FIG. 7 illustrates an embodiment of a power line communications system 600 comprising at least one first device 610 for power line communication and at least one second device 620 for power line communication and a power line 300 connecting the at least one first device 610 and the at least one second device 620 such that the at least one first device 610 and the at least one second device 620 may communicate with each other via at least one power line communications channel. At least one of the at least one first device 610 or the at least one second device 620 is a receiver 200 as described with respect to FIG. 4, whereas at least one other of the at least one first device 610 or the at least one second device 620 is a transmitter 400 as described with respect to FIG. 5. If the power line communications system 600 comprises more than one first device 610 and one second device 620, there might be different numbers of devices acting as receivers 200 for at least a specific time interval and of devices acting as transmitters 400 for the same or another specific time interval. Furthermore, at least one of the at least one first device 610 and of the at least one second device 620 may be a PLC modem 500 as described with respect to FIG. 6. It is also possible that one of the at least one first device 610 and of the at least one second device 620 acts as both a receiver 200 and a transmitter 400 if this device is configured as a PLC modem 500.

In order to allow the precise avoidance of noise at a different location of the system, all devices for power line communication being part of the power line communications system 600 should be in synchronization, wherein synchronization can be achieved using one or both of the techniques described above with respect to FIG. 4.

Some or all components of the devices for power line communication being embodiments of this disclosure may be at least in part controlled by a computer or by another software-controlled data processing apparatus, wherein control commands may be provided to the devices via the input/output to the power line or via any other input.

Figure 8:
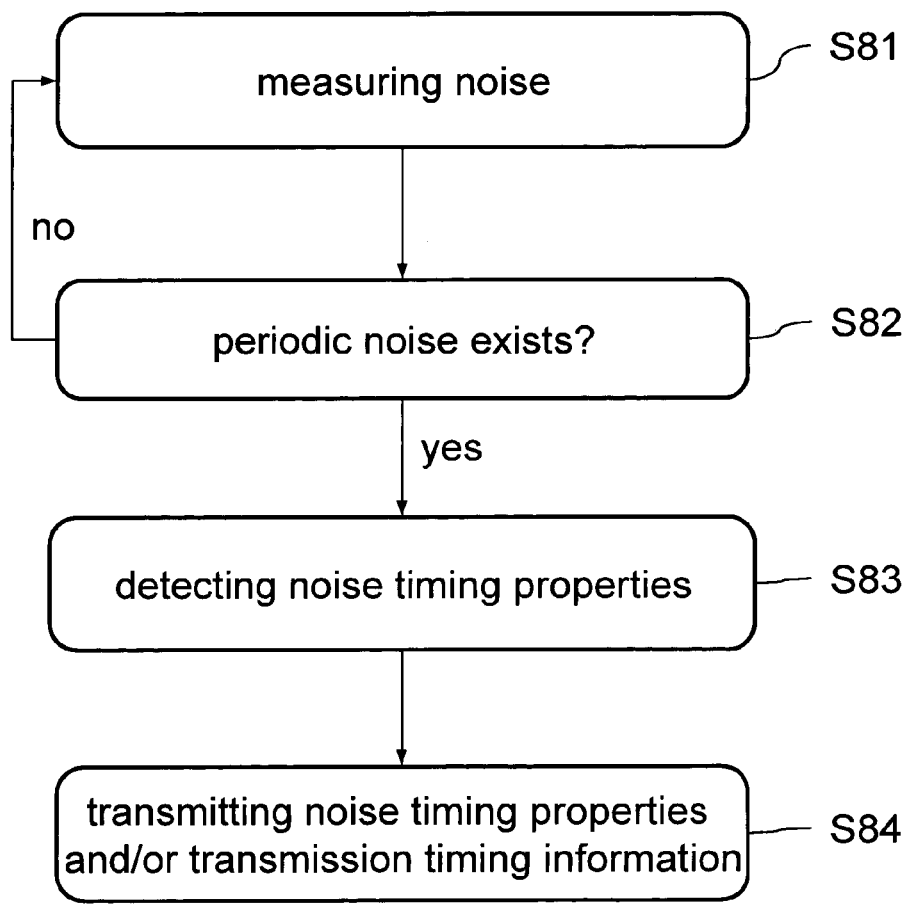
FIG. 8 illustrates a first embodiment of a method for operating a device for power line communication, wherein the device is used as a PLC receiver.

FIG. 8 illustrates a first embodiment of a method for operating a device for power line communication, wherein the device is connected to a power line and is used as a PLC receiver. That is, the device comprises components as those of the embodiment of the device for power line communication as described with respect to FIG. 4 or of the embodiment of the device for power line communication as described with respect to FIG. 6.

In a first step S81, the device measures a noise signal on the power line. For this, the device receives a signal from the power line. If the signal is received in a quiet state of communication, for example in times when the receiver detects no communication signals, the noise signal may be measured directly. However, the noise may also be determined during PLC transmissions.

In step S82, the device detects whether the measured noise signal is a periodic noise signal by identifying repeated signals and, if so, whether this periodic noise signal, i.e. a burst of it, has an amplitude which is above a predetermined threshold value which would cause interferences to power line communications. Alternatively, the receiver may determine whether a predefined signal to noise ratio is exceeded, wherein e. g. a signal to noise ratio averaged over all or some of the carriers used in communication is considered. If no periodic noise signal is detected, the device may repeat the measurement of the noise signal, for instance in predefined time intervals.

If a periodic noise signal is detected and its amplitude or the signal to noise ratio of the communication channel is above the threshold value, the device detects noise timing properties like the impulse arrival frequency IAF of the noise signal, the duration $T_{burst}$ of a noise burst, the arrival time $T_a$ of the noise burst and/or a gap time between noise bursts in step S83. Furthermore, the device may derive transmission timing information from the detected noise timing properties.

The device then transmits the detected noise timing properties and/or the transmission timing information derived from the detected noise timing properties to other devices for power line communication connected to the power line in step S84 as described above with respect to FIG. 4.

The device may repeat steps S81 to S84 periodically, i.e. in predefined time intervals, or may repeat steps S81 to S84 if it receives a command to do so, for instance from a user or a control device, or if any condition concerning the power line changes.

Figure 9:
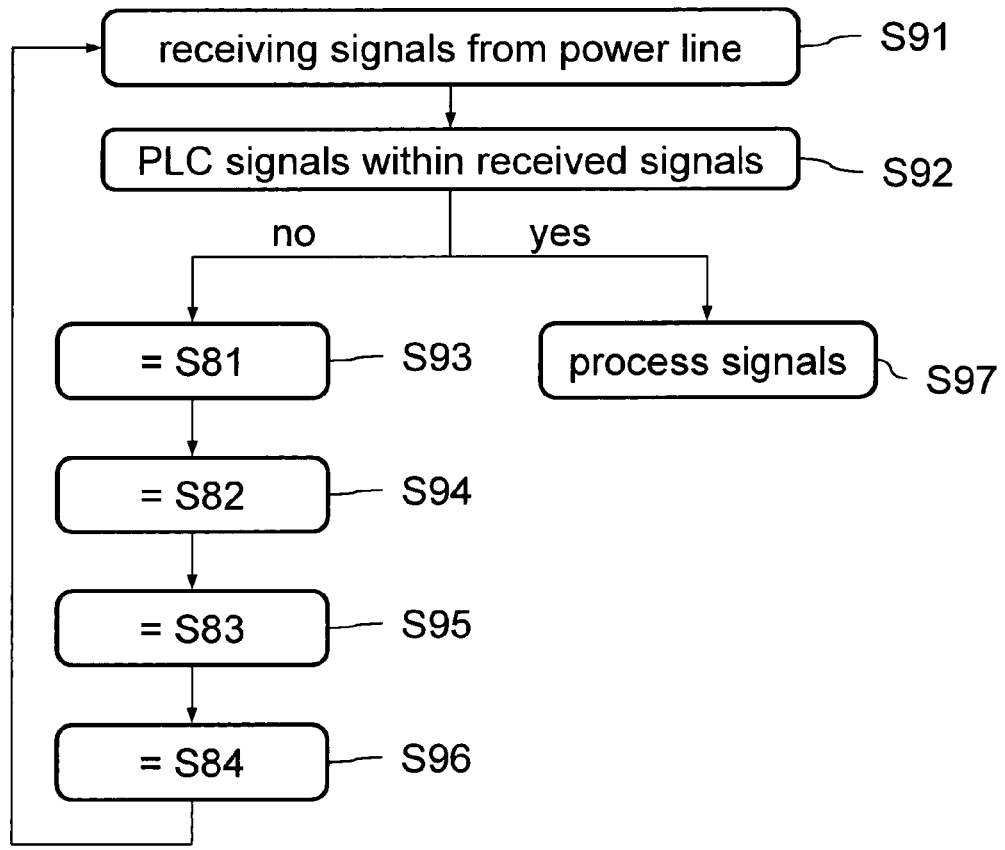
FIG. 9 illustrates a modification of the first embodiment of a method for operating a device for power line communication.

This method may also be used for starting up a network of PLC devices under severe noise conditions as will be described in the following with respect to FIG. 9. FIG. 9 illustrates a modification of the first embodiment of a method for operating a device for power line communication, wherein the device is connected to a power line and is used as a PLC receiver. First, the device receives signals from the power line in step S91 and detects whether PLC signals exist within the received signals in step S92. If the noise is very strong, conventional systems may have problems with establishing communication between PLC devices connected to the power line at all, even in the most robust mode. Thus, none of the PLC devices in the network may receive PLC signals and therefore, each of the PLC devices in the network may assume that it is the only device in the network.

If no PLC signals are detected within the received signals, the device measures the noise signal, detects whether a periodic noise signal exists in the measured noise, detects the noise timing properties like IAF, $T_{burst}$ and $T_a$ if a periodic noise signal is detected and transmits these properties and/or transmission timing information derived from those noise timing properties to other devices for power line communication connected to the power line, e.g. by broadcasting, as described with respect to steps S81 to S84 of FIG. 8 in steps S93 to S96.

Subsequently, steps S91 and S92 are repeated, and if no PLC signals are detected, steps S93 to S96 or at least step S96 are repeated until PLC signals from other PLC devices are detected in step S92. For instance, step S96 may be repeated periodically, e.g. in a time interval of 10 s.

Other PLC devices receiving the transmitted noise timing properties and/or transmission timing information may then use these data for their power line communication as will be described with respect to FIGS. 12 to 15. Since this adapts transmission such that interference with the noise signals is minimised or reduced, there is an increased likelihood that communication within the network of PLC devices may be established and further adaptations may be negotiated by the PLC devices.

If PLC signals are detected within the received signals in step S92, the received signals may be further processed in step S97. For instance, signals may be amplified, filtered or converted and data included in the signals may be decoded and further processed.

Figure 10:
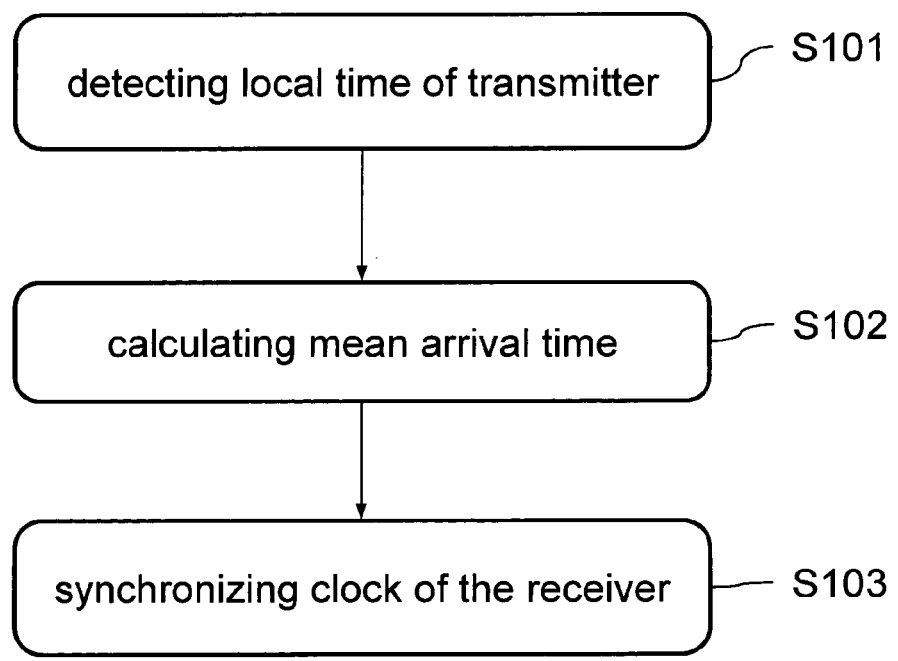
FIG. 10 illustrates a first example of a step of the modification of the first embodiment of a method for operating a device for power line communication.

FIG. 10 illustrates a first example of step S97, wherein this step may be used for synchronizing a clock of the receiving device with a clock of a transmitting device. In step S101, the device receiving the PLC signals detects a local time of a device which transmitted the PLC signals, further called transmitter. This local time is included in the data transmitted from the transmitter via the power line on at least one power line communications channel. Furthermore, the receiving device detects an arrival time of the data on its side.

Step S101 is performed for a plurality of transmitted data packets such that the receiving device may calculate a mean arrival time and a constant propagation delay of the at least one power line communications channel in step S102.

Using the calculated mean arrival time and the constant propagation delay, the receiving device may synchronize its own clock to the local time of the transmitter, i.e. to the clock of the transmitter, in step S103.

Figure 11:
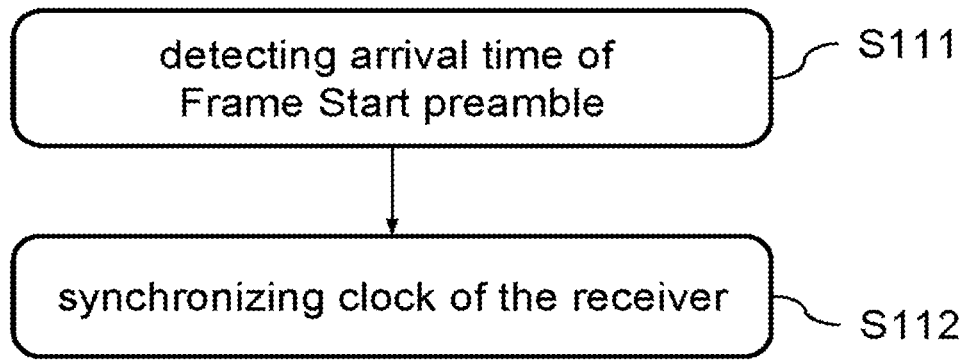
FIG. 11 illustrates a second example of a step of the modification of the first embodiment of a method for operating a device for power line communication.

FIG. 11 illustrates a second example of step S97, wherein this step may also be used for synchronizing a clock of the receiving device with a clock of a transmitting device. In this example, the predetermined time window for starting any transmission as defined by a standard used for the power line communication, for instance Homeplug AV2, is used. As explained above with respect to FIG. 4, this time window is very small and precise.

The receiving device detects an arrival time of a Frame Start preamble within data transmitted via the power line on at least one power line communications channel in step S111 and synchronizes its own clock to the Frame Start preamble, i.e. to the clock of the transmitter, in step S112.

Figure 12:
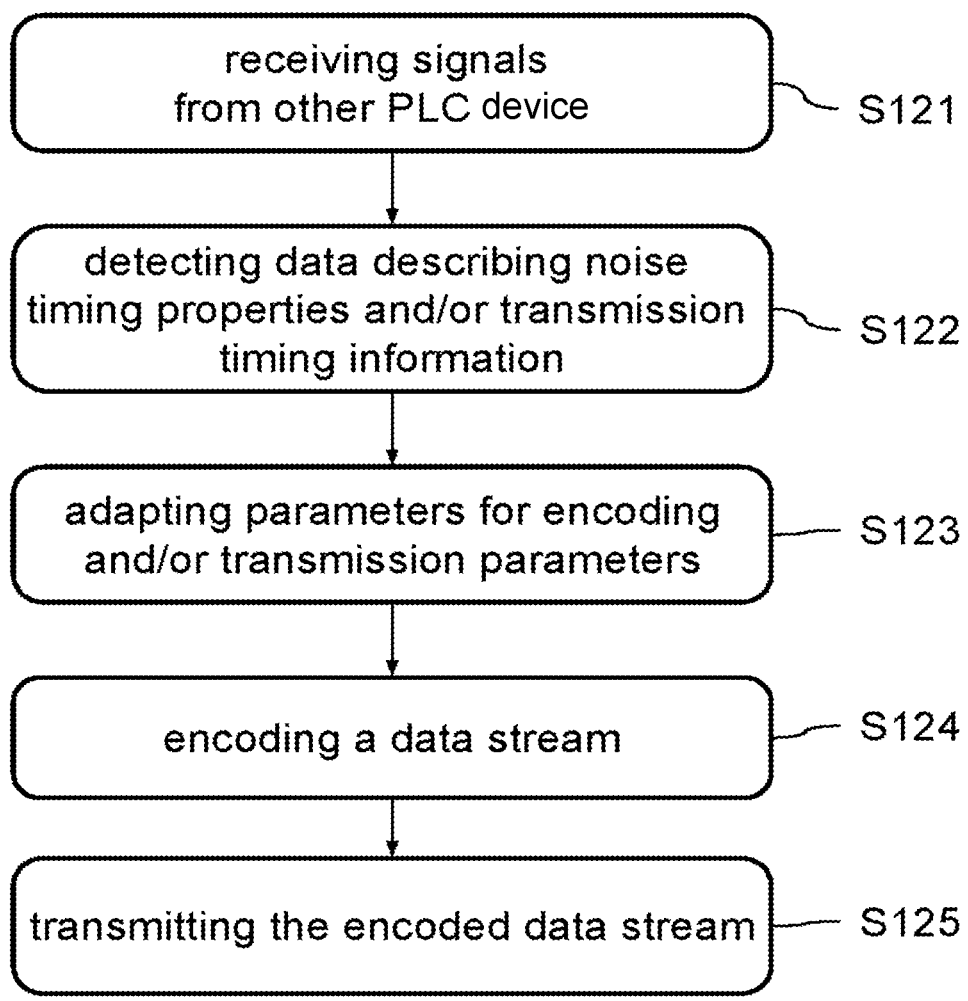
FIG. 12 illustrates a second embodiment of a method for operating a device for power line communication, wherein the device is used as a PLC transmitter.

FIG. 12 illustrates a second embodiment of a method for operating a device for power line communication, wherein the device is connected to a power line and is used as a PLC transmitter. That is, the device comprises components as those of the embodiment of the device for power line communication as described with respect to FIG. 5 or of the embodiment of the device for power line communication as described with respect to FIG. 6.

In a first step S121, the device receives signals from another device for power line communication connected to the power line, wherein this other device previously performed the method according to the first embodiment of the method for operating a device for power line communication as described with respect to FIGS. 8 to 11. That is, the other device had previously detected the noise timing properties of a noise signal on the power line and/or corresponding transmission timing information and had transmitted these data to the device. The device may receive the signals comprising the data via the power line or via any other input as described with respect to FIG. 5.

In step S122, the device then detects data within the received signals, the data describing the detected noise timing properties and/or the transmission timing information, respectively.

Additionally, the device may derive transmission timing information from data describing the detected noise timing properties if no transmission timing information was included in the data.

Subsequently, the device adapts the parameters of a modulation scheme for encoding a data stream and/or transmission parameters, i.e. the parameters of its own transmission, to the data detected in step S122 or to the transmission timing information derived from data describing the detected noise timing properties in step S122 in step S123.

In step S124, the device encodes a data stream according to the adapted parameters for encoding, i.e. to the parameters adapted in step S123, and transmits the encoded data stream to the other device for power line communication connected via the power line on at least one power line communications channel according to the adapted transmission parameters in step S125.

Figure 13:
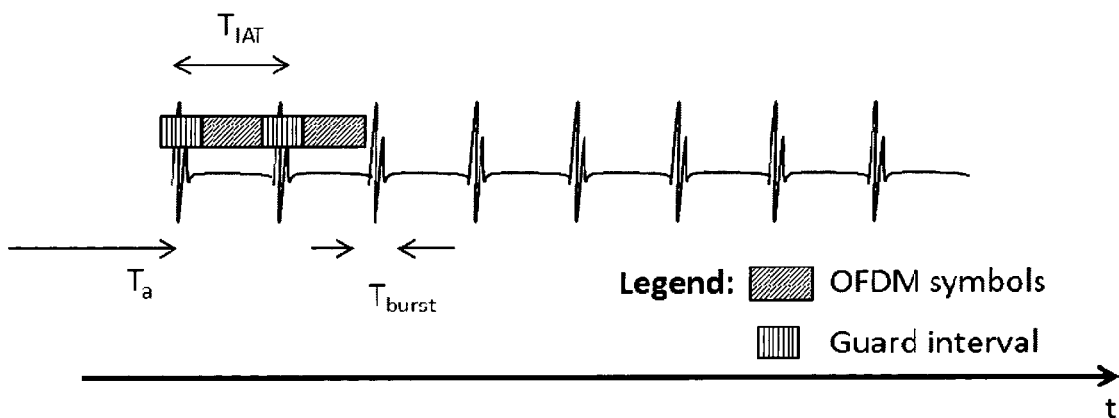
FIG. 13 explains a first example of a step of the second embodiment of a method for operating a device for power line communication.
Figure 14:
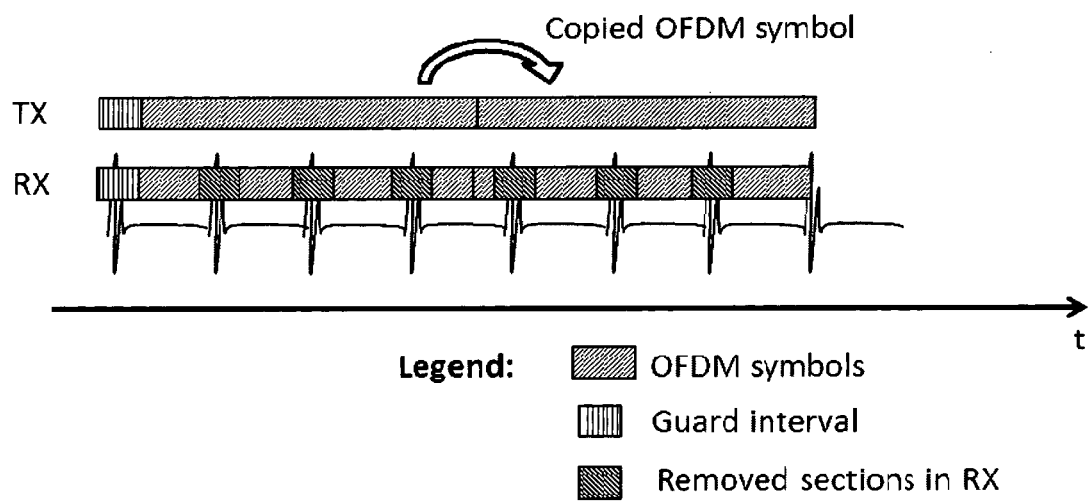
FIG. 14 explains a second example of a step of the second embodiment of a method for operating a device for power line communication.
Figure 15:
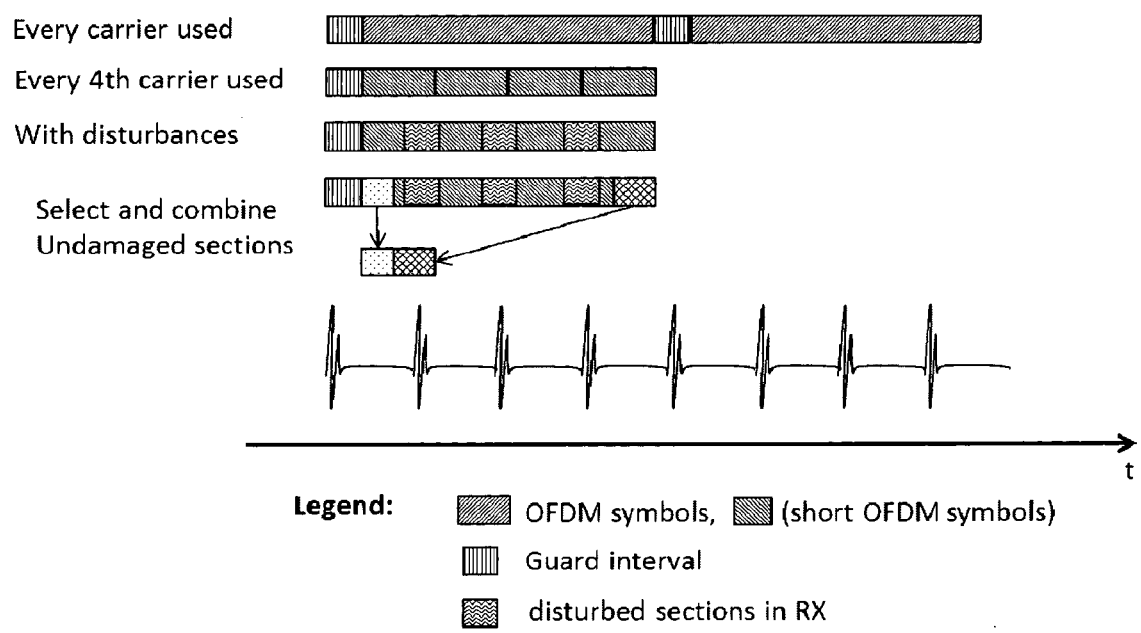
FIG. 15 explains a third example of a step of the second embodiment of a method for operating a device for power line communication.

The step S123 of adapting the parameters for encoding and/or the transmission parameters is described in more detail with respect to FIGS. 13 to 15. By way of example, Orthogonal Frequency Division Multiplexing (OFDM) technology is used for modulation, wherein data are transmitted in symbols and wherein guard intervals may be inserted between individual symbols, i.e. between symbols having a different content, for improving the transmission by decreasing the error rate caused by interference between individual data packets. The parameters of the transmission are advantageously adapted such that the noise has only minimal impact on PLC throughput.

FIG. 13 explains a first example of adapting the parameters for encoding and/or the transmission parameters and shows the progression of the noise signal and of the PLC signal at a receiving device over the time. As a first parameter, the OFDM symbol duration (without the guard interval) may be adapted such that it is smaller than the gap time between two noise bursts. That is, the OFDM symbol duration is shorter than the difference of the time period $T_{IAT}$ of the periodic noise minus the duration $T_{burst}$ of a noise burst. In addition or alternatively, the duration of the OFDM guard interval, as a further parameter, is chosen such that it is longer than the duration $T_{burst}$ of a single noise burst. Moreover, the transmission is synchronized to the periodic noise signal. For this purpose, the starting time for sending of each OFDM symbol is chosen such that the arrival time of each OFDM symbol is different from the arrival time of a noise burst at the other PLC device to which the data were transmitted, i.e. at the receiving device. In the result, each OFDM symbol is transmitted in a time interval between two noise bursts, i.e. in a quiet time period between two noise impulses, whereas each OFDM guard interval overlaps with a noise burst. Since the guard intervals are not processed (decoded) by the receiving device anyway, the noise bursts will not interfere with the transmission of data anymore.

A shorter duration of OFDM symbols may be achieved by increasing the OFDM carrier spacing, resulting in a smaller number of OFDM carriers. The following example illustrates the relations between the OFDM parameters: Homeplug AV2 standard uses a FFT size of 8192 at a sampling frequency of 200 MHz, wherein the used analogue frequency ranges up to 100 MHz. This results in a carrier spacing of 24.414 kHz and a symbol duration (without the guard interval) of 40.96 μs. If the FFT size is decreased by one half, the carrier spacing is doubled and the symbol duration is ½·40.96 μs. With the noise parameters of $T_{IAT}$=10 μs and $T_{burst}$=0.5 μs, the following parameters could be used for the OFDM modulation: OFDM symbol duration of 5.12 μs (=⅛·40.96 μs) and FFT size of 1024 (=⅛·8192). The guard interval must be greater than $T_{burst}$=0.5 μs or the OFDM symbol duration including the guard interval must be shorter than the time interval between two noise bursts.

FIG. 14 explains a second example of adapting the parameters for encoding and/or the transmission parameters and shows the progression of a PLC signal at a transmitting device (TX) and of the noise signal and of the PLC signal at a receiving device (RX) over the time. In this example, the duration of the OFDM symbols may not be reduced, and the duration of one OFDM symbol may be longer than the time interval between two noise bursts or even longer than the time period $T_{IAT}$ of the noise signal. Each OFDM symbol is transmitted several times, i.e. at least twice, wherein the starting time for sending of each repetition of one and the same OFDM symbol is chosen different from the starting time of another repetition with respect to the arrival time of the noise bursts at the receiving device. That is, the arrival time of each repetition of one and the same OFDM symbol at the receiving device is different from the arrival time of another repetition of the same OFDM symbol with respect to the arrival time of a noise burst. Therefore, in each repetition of one and the same OFDM symbol, different sections of the OFDM symbol are interfered. Since the receiving device informed the transmitter about its recommendation, it will expect that the transmitter uses the recommendation for future communication and adapt processing of received communication signals accordingly. The receiving device will omit the interfered sections of each repetition of one and the same OFDM symbol and will replace them by corresponding sections of other repetitions of the same OFDM symbol, wherein the corresponding sections are not interfered. Thus, the receiving device will compose the whole OFDM symbol from not-interfered sections of different repetitions of the OFDM symbol.

In case that the duration of one OFDM symbol is identical to the time period $T_{IAT}$ of the noise signal or to a multiple of it, identical sections of subsequent OFDM symbols would be interfered. To avoid this, the OFDM symbols or each repetition of one and the same OFDM symbol may be transmitted using a variable guard interval.

The number of repetitions of one and the same OFDM symbol is determined such that all sections of a specific OFDM symbol may be received and decoded by the receiving device.

In the shown example, the same OFDM symbol is sent twice, wherein each symbol is interfered at three or four sections, which will be cut out by the receiver. The automatic gain control (AGC) settings of the receiver are set for optimal reception of OFDM symbols. Therefore, if noise bursts are louder then the PLC signal, some clipping at the analog/digital converter (ADC) will happen. The omitted sections of the first repetition of the symbol will be replaced with corresponding non-interfered sections of the second repetition of the OFDM symbol by the receiver.

FIG. 15 explains a third example of adapting the parameters for encoding and/or the transmission parameters and shows the progression of a PLC signal at a transmitting device in a case where the modulation is not adapted (topmost line) and in an adapted case (second line from top) and the progression of the PLC signal at a receiving device (RX) (third line from top) and of the noise signal (lowermost line) over the time as well as the way of selecting and combining undamaged sections of different repetitions of one and the same OFDM symbol at the receiving device (fourth line from top).

The topmost line shows two different OFDM symbols, each one being preceded by a guard interval. Each OFDM symbol is longer than the time period $T_{IAT}$ of the periodic noise signal shown in the lowermost line. The second line from top shows that the transmitting device reduces the duration of an OFDM symbol by the factor 1/n and repeats this shorter OFDM symbol n times. In the shown example, n equals 4. Therefore, only every nth subcarrier (in the example every $4^{th}$ subcarrier) can be used for transmission. In the second to fourth line from top, only OFDM symbols corresponding to the first OFDM symbol of the topmost line are shown. However, even the shortened OFDM symbols are longer than the difference of the time period $T_{IAT}$ of the noise signal and the duration $T_{burst}$ of a noise burst. Therefore, each shortened OFDM symbol is interfered by the noise signal when received at the receiving device, as shown in the third line from top. Since, however, each repetition of the shortened OFDM symbol is interfered at different sections, the receiving device may combine undamaged sections of different repetitions and may thus generate data corresponding to an undamaged OFDM symbol (see fourth line from top).

Although the bitrate is decreased because only every nth subcarrier can be used, the signal-to-noise ratio (SNR) of the used subcarriers is increased by the combination in the time domain, and a higher modulation scheme might be used resulting in at least partial compensation of the decreased bitrate.

If adaptive modulation is used, the devices of a power line communications system are informed about the modulation order to be used for each OFDM subcarrier in order to adapt to the frequency-selective behavior of the PLC channel. This information is contained in a tonemap. Some of the subcarriers might not be used for transmission of data. In conventional techniques, a transmitting device applies a so-called empty-tone-filling to the un-used subcarriers by loading a known sequence to these carriers to help channel estimation. In the present disclosure, the function of filling these empty tones is in one embodiment turned off to ensure the desired behavior of the repetitions in the time-domain. Otherwise due to the filled empty tones the symbol length would increase again.

Figure 16:
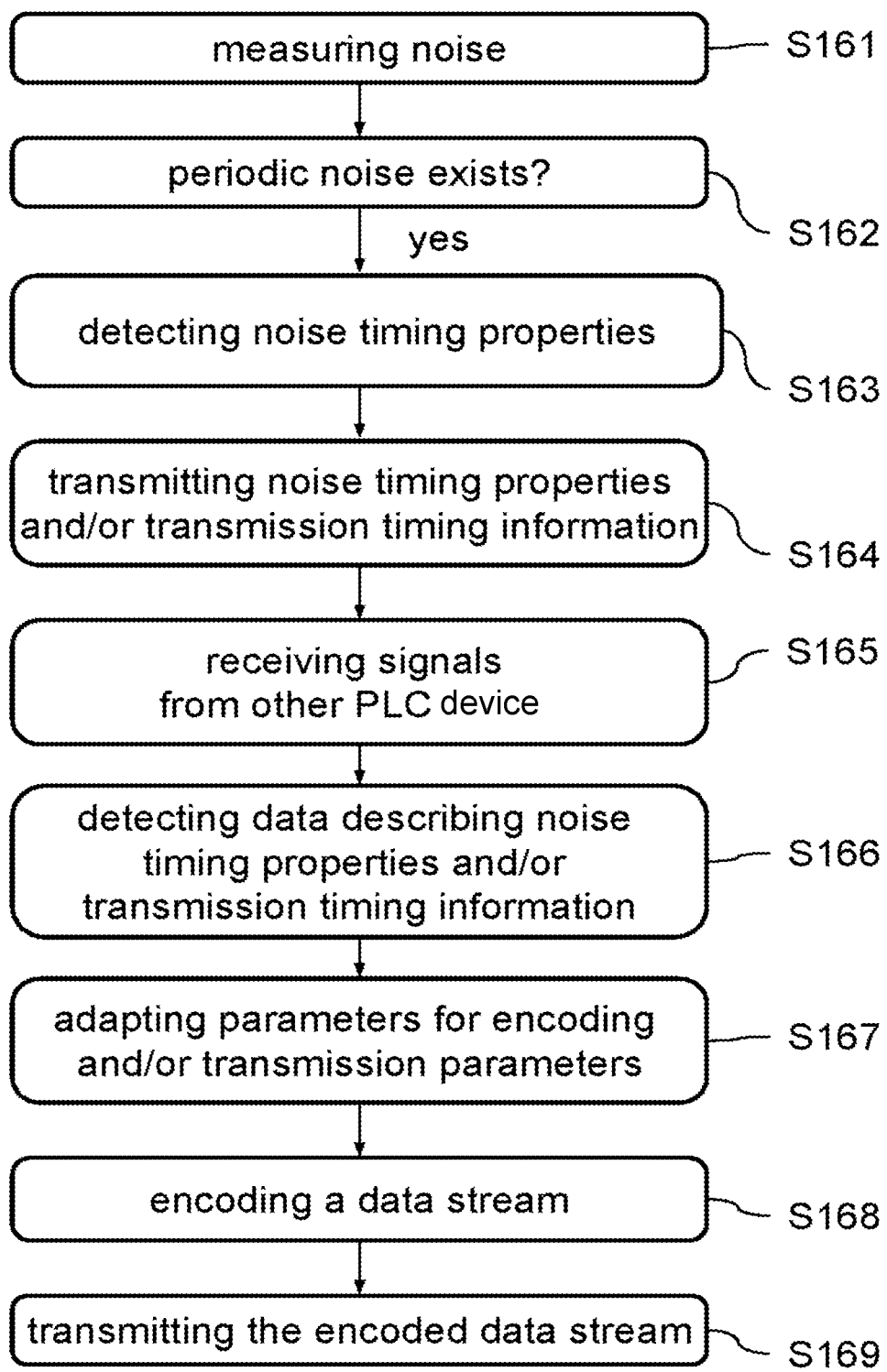
FIG. 16 illustrates an embodiment of a method for operating a power line communications system.

FIG. 16 illustrates an embodiment for operating a power line communications system comprising a power line, a first device for power line communication and a second device for power line communication, wherein the first device and the second device are connected to the power line. One of the first and the second device may be used as a PLC receiver, wherein the other one of the first and the second device is used as a PLC transmitter.

The receiving device or PLC receiver measures the noise signal and detects timing properties of the noise in steps S161 to S163 as described above with respect to FIG. 8. The receiving device then informs the transmitting device about the detected noise timing properties and/or transmission timing information derived from the detected noise timing properties in step S164 as described above with respect to FIG. 8. That is, steps S161 to S164 correspond to steps S81 to S84, respectively. Furthermore, the receiving device may send a channel estimation indication message which contains information about the tonemap and the guard interval to be used and other information to the transmitting device. The channel estimation indication message may further comprise a flag signaling that the function of empty-tone-filling is not to be used by the transmitting device.

The transmitting device or PLC transmitter receives these signals from the receiving device in step S165 and detects the data describing the detected noise timing properties and/or the transmission timing information within the received signals in step S166. It then adapts the parameters for encoding a data stream and/or transmission parameters in step S167, encodes a data stream according to the adapted parameters for encoding in step S168 and transmits the encoded data stream via the power line to the receiving device according to the adapted transmission parameters in step S169. That is, steps S165 to S169 correspond to steps S121 to S125, respectively, as described above with respect to FIG. 12.

Measuring the noise signal by a receiving device provides the advantage of detecting the noise signal at that side of communication at which the noise is interfering. Thus, cases where the noise is louder at the receiving side than at the transmitting side can be treated in an optimal way.

However, it is also possible that the noise is measured at the transmitting side by a transmitting device. In this case, the device for power line communication may be a PLC modem 500 as described with respect to FIG. 6, and a method for operating such a device may comprise the steps of measuring noise on the power line, detecting whether a periodic noise signal exists within the measured noise, detecting the noise timing properties and/or transmission timing information, adapting parameters of a modulation scheme for encoding a data stream and/or transmission parameters according to the detected noise timing properties and/or the transmission timing information, encoding a data stream according to the adapted parameters for encoding and transmitting the encoded data stream to the power line according to the adapted transmission parameters.

Since the impulse arrival frequency IAF and the periodic impulse arrival time $T_{IAT}$ correspond to each other according to formula (1), also $T_{IAT}$ may be determined and transmitted or detected and used instead of IAF throughout all embodiments of the device for power line communication or of the method for operating a device for power line communication or a power line communications system described in this disclosure.

The present disclosure provides devices and methods for establishing power line communication which is immune against a periodic noise, and in particular a periodic noise which is not synchronous with the AC mains signal.

Since the devices for power line communication which are described in this disclosure and which may be operated by the methods described above may be controlled, at least in part, by a software-controlled data processing apparatus, it will be appreciated that a computer program product including computer-program instructions for performing the method steps and a non-transitory machine-readable medium carrying such a computer program product, such as an optical disk, a magnetic disk, semiconductor memory or the like, are also considered to represent embodiments of the present disclosure.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A device for power line communication comprising: circuitry configured to:
   receive signals from a power line;
   detect timing properties of noise;
   detect whether the noise is periodic; and
   transmit at least one of the detected noise timing properties and transmission timing information derived from the detected noise timing properties to at least one other device connected to the power line only if the noise is periodic.

2. The device according to claim 1,
   wherein the detected noise timing properties comprise at least one of an impulse arrival frequency of a noise signal, a duration of a noise burst, an arrival time of the noise burst, and a gap time between noise bursts.

3. The device according to claim 1,
   wherein the transmission timing information comprises at least one of an OFDM symbol duration, a duration of an OFDM guard interval, a start time for sending an OFDM symbol, and a number of repetitions of a specific OFDM symbol.

4. The device according to claim 1,
   wherein the circuitry is configured to transmit the at least one of the detected noise timing properties and the transmission timing information only if a periodicity of the noise is not equal to a periodicity of a AC mains cycle on the power line.

5. The device according to claim 1, wherein the circuitry is configured to
   periodically transmit the at least one of the detected noise timing properties and transmission timing information derived from the detected noise timing properties.

6. The device of claim 1, wherein
the circuitry includes a clock, and
the circuitry is configured to:
  detect a local time of a transmitting device, including the at least one other device, from data transmitted via the power line on at least one power line communications channel and an arrival time of the data,
  calculate a mean arrival time of a plurality of transmitted data and a constant propagation delay of the at least one power line communications channel, and
  synchronize the clock to the local time of the transmitting device.

7. The device of claim 1, wherein
the circuitry includes a clock, and
the circuitry is configured to:
  detect an arrival time of a Frame Start preamble within data transmitted from the at least one other device via the power line on at least one power line communications channel, and
  synchronize the clock to the Frame Start preamble.

8. A power line communication system comprising:
a first device according to the device of claim 1; and
a second device, wherein
the power line connects the first device and the second device via at least one power line communications channel.

9. A transmitting device for power line communication to be connected to a power line, the device comprising:
circuitry configured to:
  receive signals from another device connected to the power line;
  detect data within the received signals, the data describing at least one of timing properties of noise detected at the other device and transmission timing information derived from the detected noise timing properties;
  encode a data stream;
  transmit the encoded data stream to the power line on at least one power line communications channel; and
  adapt at least one of parameters for encoding and transmission parameters for transmitting the encoded data stream according to the detected data,
wherein the at least one of the parameters for encoding and the transmission parameters for transmitting the encoded data adapted according to the detected data comprise at least one of an OFDM symbol duration, a duration of an OFDM interval, a start time for sending an OFDM symbol, and a number of repetitions of a specific OFDM symbol in the transmitted encoded data stream.

10. A method for operating a device for power line communication connected to a power line, the method comprising:
  measuring noise on the power line;
  detecting timing properties of the noise;
  detecting whether the noise is periodic; and
  transmitting at least one of the detected noise timing properties and transmission timing information derived from the detected noise timing properties to at least one other device connected to the power line only if the noise is periodic.

11. The method of claim 10, wherein the noise is measured during a period of time when no communication signals are detected on the power line on at least one power line communications channel.

12. The method of claim 10, wherein
the at least one of the determined noise properties and the transmission timing information are periodically transmitted.

13. The method of claim 10, further comprising:
detecting a local time of a transmitting device, including the at least one other device, from data transmitted via the power line on at least one power line communications channel and an arrival time of the data,
calculating a mean arrival time of a plurality of transmitted data and a constant propagation delay of the at least one power line communications channel, and
synchronizing a clock of the device to the local time of the transmitting device.

14. The method of claim 10, further comprising:
detecting an arrival time of a Frame Start preamble within data transmitted from the at least one other device via the power line on at least one power line communications channel and
synchronizing a clock of the device to the Frame Start preamble.

15. A method for operating a power line communication system including a power line, a first device for power line communication and a second device for power line communication, the first device and the second device being connected to the power line, the method comprising:
  performing a method for operating a device according to claim 10 at the first device, and
  performing a method for operating a device at the second device.

16. A non-transitory computer program product storing computer-program instructions, which, when executed by a computer, cause a device to perform a method according to claim 10.

17. A method for operating a transmitting device for power line communication connected to a power line, the method comprising:
  receiving signals from another device connected to the power line;
  detecting data within the received signals, the data describing at least one of noise timing properties detected at the other device and transmission timing information derived from said detected noise timing properties;
  adapting at least one of parameters for encoding a data stream and transmission parameters for transmitting an encoded data stream according to the detected data;
  encoding a data stream according to the adapted parameters; and
  transmitting the encoded data stream to the power line on at least one power line communications channel according to the adapted transmission parameters,
wherein the transmission timing information includes at least one of an OFDM symbol duration, a duration of an OFDM guard interval, a start time for sending an OFDM symbol, and a number of repetitions of a specific OFDM symbol.

18. The method of claim 17, wherein
the at least one of the adapted parameters for encoding and the adapted transmission parameters include the OFDM symbol duration, the duration of an OFDM guard interval, and the start time for sending an OFDM symbol,
the OFDM symbol duration is chosen such that it is smaller than a gap between two noise bursts,
the duration of the OFDM guard interval is chosen such that it is larger than a duration of a noise burst, and the start time for sending of each OFDM symbol is chosen such that an arrival time of each OFDM symbol at the other device is different from an arrival time of a noise burst at the other device.

19. The method of claim 17, wherein the adapted transmission parameters include the number of repetitions of a specific OFDM symbol, and each OFDM symbol is repeated a predetermined number of times such that an arrival time of each repetition of the OFDM symbol at the other device is different from an arrival time of another repetition of the same OFDM symbol at the other device with respect to an arrival time of a noise burst at the other device.

20. The method of claim 17, further comprising turning off a function of the encoding for filling empty tones in the data stream.

21. A device for power line communication comprising:
   circuitry configured to:
      receive signals from a power line;
      detect timing properties of noise; and
      transmit at least one of the detected noise timing properties and transmission timing information derived from the detected noise timing properties to at least one other device connected to the power line,
   wherein the transmission timing information comprises at least one of an OFDM symbol duration, a duration of an OFDM guard interval, a start time for sending an OFDM symbol, and a number of repetitions of a specific OFDM symbol.

22. A method for operating a device for power line communication connected to a power line, the method comprising:
   measuring noise on the power line;
   detecting timing properties of the noise; and
   transmitting at least one of the detected noise timing properties and transmission timing information derived from the detected noise timing properties to at least one other device connected to the power line,
   wherein the transmission timing information comprises at least one of an OFDM symbol duration, a duration of an OFDM guard interval, a start time for sending an OFDM symbol, and a number of repetitions of a specific OFDM symbol.

23. A transmitting device for power line communication to be connected to a power line, the device comprising:
   circuitry configured to:
      receive signals from another device connected to the power line;
      detect data within the received signals, the data describing at least one of timing properties of noise detected at the other device and transmission timing information derived from the detected noise timing properties;
      encode a data stream;
      transmit the encoded data stream to the power line on at least one power line communications channel; and
      adapt at least one of parameters for encoding and transmission parameters for transmitting the encoded data stream according to the detected data,
   wherein the transmission timing information comprises at least one of an OFDM symbol duration, a duration of an OFDM guard interval, a start time for sending an OFDM symbol, and a number of repetitions of a specific OFDM symbol.

* * * * *